Aug. 18, 1925.
M. D. PROUTY ET AL
1,549,800
DEVICE FOR ILLUMINATING OIL GAUGES
Filed Jan. 21, 1924
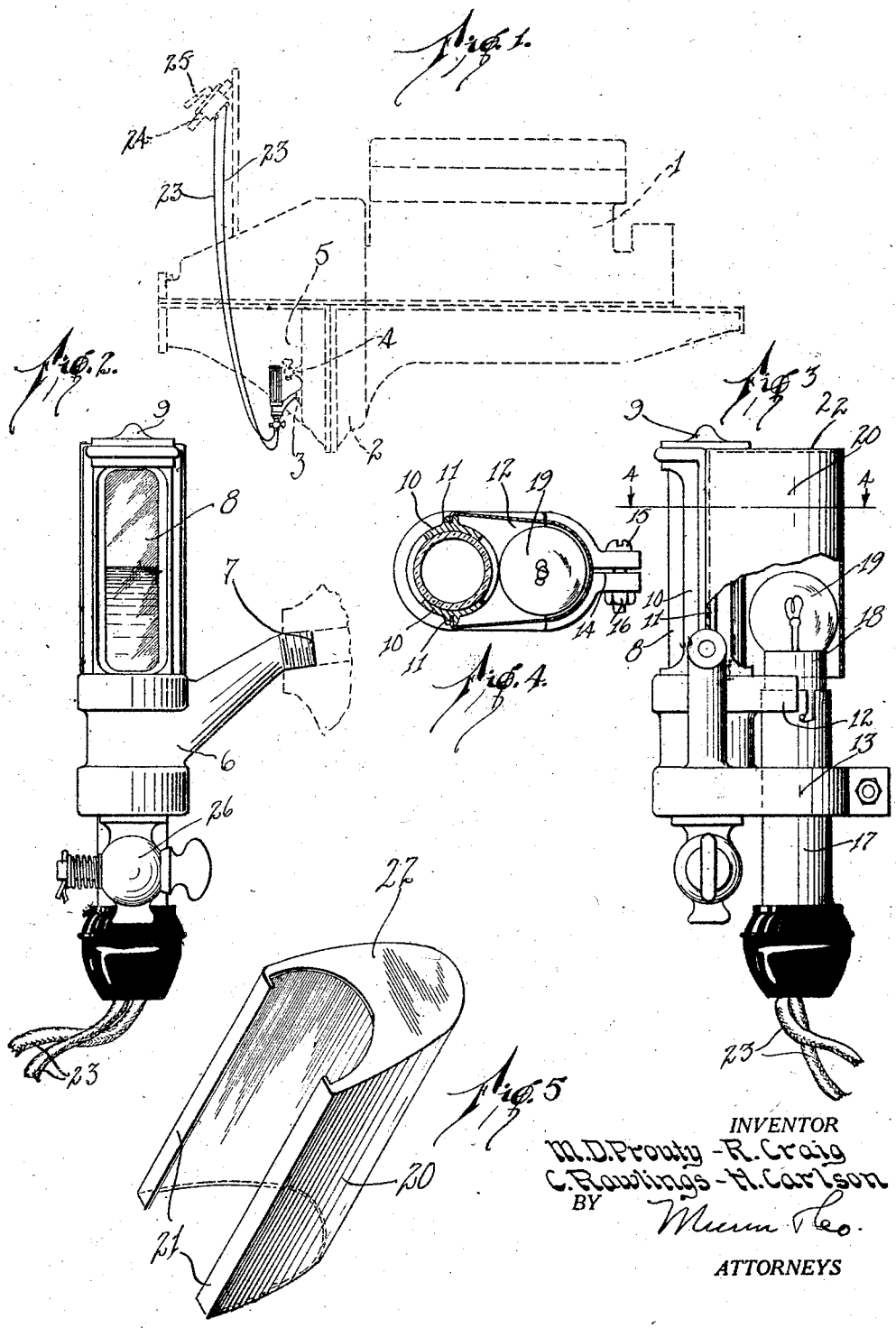
INVENTOR
M.D.Prouty - R.Craig
C.Rawlings - H.Carlson
BY
ATTORNEYS Patented Aug. 18, 1925.

1,549,800

UNITED STATES PATENT OFFICE.

MORTON D. PROUTY, ROLLIE CRAIG, CLIFFORD RAWLINGS, AND HARRY CARLSON, OF GALVA, IOWA.

DEVICE FOR ILLUMINATING OIL GAUGES.

Application filed January 21, 1924. Serial No. 687,551.

*To all whom it may concern:*

Be it known that we, MORTON D. PROUTY, ROLLIE CRAIG, CLIFFORD RAWLINGS, and HARRY CARLSON, citizens of the United States, and residents of Galva, in the county of Ida and State of Iowa, have invented a new and useful Improvement in Devices for Illuminating Oil Gauges, of which the following is a full, clear, and exact description.

Our invention relates to improvements in devices for illuminating oil gauges, and the like, and it consists in the combinations, constructions, and arrangements herein described and claimed.

An object of our invention is to provide a device for illuminating oil gauges in which a combination reflecting and protecting member is employed, by means of which practically all of the light from an incandescent lamp is projected through the gauge glass of an oil gauge upon which the reflecting element and lamp are supported.

A further object of our invention is to provide a device for illuminating oil gauges in which particularly novel structure is employed for supporting the combination reflecting and protecting member upon the oil gauge, whereby the reflecting element may be instantly removed for the purpose of polishing and the like, and for the replacement of an incandescent lamp bulb, yet which is incapable of unintentional dislodgement from the oil gauge by vibration and shocks imparted to the gauge as the motor vehicle upon which the engine having the oil gauge is mounted passes over the road.

A further object of our invention is to provide a device of the type described in which the current source employed for operating the incandescent lamp may be the same current source employed for operating the head lamps and electrical equipment of the vehicle, and in which the operation of the lamp may be controlled from the instrument board of the motor vehicle.

A further object of our invention is to provide a device of the type described which may be attached to the ordinary type of threaded pet cock vent provided in the crank case of the internal combustion engine and without the necessity of reconstructing the crank case for the support of the device.

A further object of our invention is to provide a device of the type described that is extremely simple in construction, which is efficient in operation, and which is thoroughly practical commercially.

Other objects and advantages will appear in the following specification, and the novel features of the invention will be particularly pointed out in the appended claims.

Our invention is illustrated in the accompanying drawings, forming part of this application, in which—

Figure 1 is a view of an embodiment of our invention, operatively applied to the ordinary type of internal combustion engine, Figure 2 is an enlarged front elevation of a part of the mechanism illustrated in Figure 1, Figure 3 is a side elevation of the mechanism illustrated in Figure 2, Figure 4 is a sectional view along the line 4—4 of Figure 3, and Figure 5 is an enlarged perspective view of the reflecting element employed in our improved illuminating device.

In carrying out our invention we make use of an internal combustion engine 1 having a crank case 2 in which lubricant for lubricating the moving parts of the engine is placed. In this type of internal combustion engine the crank case 2 is provided with a pair of pet cock vents 3 and 4. These vents 3 and 4 are threaded and normally serve to support pet cocks such as shown at 5, (see Figure 1).

Our present invention necessitates the removal of the lower pet cock from the vent 3 and the substitution therefor for an oil gauge comprising a body member 6 having an exteriorly threaded tubular portion 7 which is engaged with the threaded portion 3, and thereby supported. The body portion 6 is arranged to stand in a substantially vertical position as shown in Figure 2, and has a glass tube or gauge glass 8 communicating with the upper end of the hollow body portion 6, the upper end of which is closed by means of a metal closure 9 supported by upwardly extending metal guard members 10 which in turn are supported upon the body member 6. These guard members 10 prevent the accidental movement of the gauge glass 8 from the body member 6 and also serve to protect the gauge glass from becoming broken. The guard members 10 are each provided with vertically extending slots 11, diametrically opposed from one another on the outermost walls thereof.

The lower end of the body member 6 has a rearwardly extending apron 12.

A socket supporting member 13 is carried by the extreme lower part of the body member 6 and is arranged to extend rearwardly therefrom. This member 13 is substantially annular in cross section at its rearwardly extending part, and is split as shown at 14. A binding bolt 15 having a nut 16 therefor is projected through the adjacent parts of the split annulus forming a part of the socket supporting member 13 and serves as means for locking an incandescent lamp socket 17 against movement when projected through the member 13 as shown in Figure 3.

The upper end of the socket 17 is arranged to rest upon the apron 12, thus preventing movement of the socket 17 toward the gauge glass 8, and stabilizing the assembly.

The ordinary type of incandescent lamp 18 is carried by the socket 17 and is disposed with its filament 19 substantially in the rear of the gauge glass 8, so that light therefrom may project through the gauge glass and be visible from the front of the gauge glass. A reflecting element, (see Figure 5), semielliptical in cross section, is shown at 20 and is provided with a pair of inwardly extending portions 21 which are arranged to be received in the inwardly extending slots 11, so that when the reflecting element is in place, it may encompass the incandescent lamp 18, shutting off light from the lamp 18 to the rear of the device and reflecting that light through the gauge glass 8.

The upper end 22 of the reflecting element 20 is closed, as shown in Figure 5, so that virtually all of the light from the lamp 18 must pass through the gauge glass 8.

Suitable conducting wires 23 are connected with the socket 17 and extends upwardly, (see Figure 1) to the instrument board 24 of the motor vehicle, upon which the switch 25 is disposed, for controlling the flow of current from the battery, (not shown), forming a part of the regular equipment of the motor vehicle in which the engine 1 is employed.

In order that we may not forfeit any advantages by the provision of the pet cock for the vent 3, a pet cock 26 is disposed at the lowermost end of the body member 6 and is arranged to communicate therewith so that oil from the body member 6 may be drained therefrom and consequently from the crank case 2, as though our improved device for illuminating oil gauges were not in use upon the engine 1.

From the foregoing description of the various parts of the device, the operation thereof may be readily understood. Let us assume that the motor vehicle in which the engine 1 is employed has been driven for some time and that the driver desires to determine the level of oil in the crank case 2. It is only reasonable to assume that the gauge glass 8 will be covered with particles of dust or mud from the road over which the vehicle has passed. This obscuring of the gauge glass 8 by extraneous substances, such as dust and mud, makes it impossible for the driver to determine with any degree of accuracy the level of oil or lubricant within the gauge glass. In many cases it is impossible to view the oil within the glass.

With our present improvement, it is merely necessary to operate the switch 25, thereby causing the lamp 18 to operate and project light through the gauge glass 8. It is then an easy matter to determine the exact level of the oil in the glass. When such observation has been made, the switch 25 is opened, and the incandescent lamp 18 will become inoperative.

It is obvious that the provision of the slots 11 in the guard members 10 and the engagement of the inwardly turned portions of the reflector 20 bring about a frictional support of the reflecting element upon the oil gauge, which permits the ready manual removal of the reflecting element from the gauge, yet which positively precludes the unintentional removal of the reflector 20 from the oil gauge by vibration as the vehicle upon which the device is used passes over the road.

We claim:

1. A device of the type described comprising an oil gauge having a body member, said body member having grooves in the outermost wall thereof, an incandescent lamp supported upon said body member, a transparent gauge glass carried by said body member, and a combination protecting and reflecting element having portions arranged to be received in the grooves in said body member, whereby said reflecting and protecting member may encompass said incandescent lamp and cause the light therefrom to be projected through said gauge glass.

2. A device of the type described comprising a body member, a transparent gauge glass carried by said body member, means for conducting oil or the like through said body member to said gauge glass, an incandescent lamp supported upon said body member and in registration with said gauge glass, said body member having a pair of parallel upstanding portions, one disposed on either side of said gauge glass for protecting said glass, said upstanding portions having grooves on the outer walls thereof, and a combination protecting and reflecting element having portions arranged to be received in the grooves of said upstanding portions, whereby said protecting and reflecting member may encompass said incandescent lamp and cause the light therefrom to be projected through said gauge glass, the connection between said upstanding portions and said reflecting member being substantially dust-tight.

MORTON D. PROUTY.
ROLLIE CRAIG.
CLIFFORD RAWLINGS.
HARRY CARLSON.